C. T. LACK.
APPARATUS FOR SEVERING METALS BY FUSION.
APPLICATION FILED NOV. 25, 1914.
1,141,560.
Patented June 1, 1915.
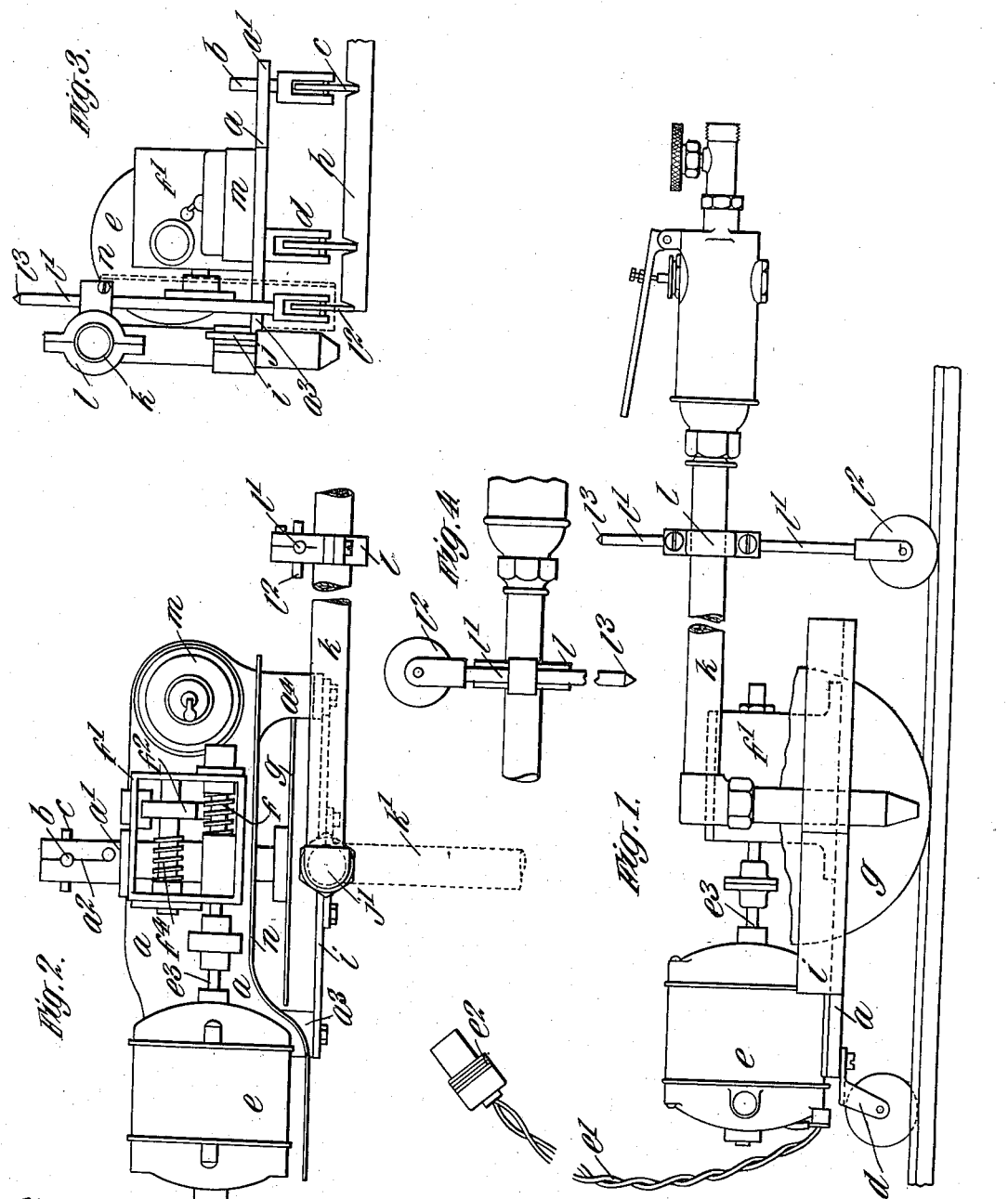
Witnesses:
M. E. Clark
L. P. Chamberlain
Inventor:
Charles Tibbit Lack
By Edson Bros
Attorneys.

UNITED STATES PATENT OFFICE.

CHARLES TIBBIT LACK, OF IMPINGTON, ENGLAND, ASSIGNOR OF ONE-HALF TO CHIVERS & SONS, LIMITED, OF HISTON, ENGLAND.

APPARATUS FOR SEVERING METALS BY FUSION.

1,141,560.

Specification of Letters Patent.

Patented June 1, 1915.

Application filed November 25, 1914. Serial No. 874,053.

*To all whom it may concern:*

Be it known that I, CHARLES TIBBIT LACK, a subject of the King of Great Britain, residing at "Millfield," Impington, in the county of Cambridge, England, have invented certain new and useful Improvements in and Relating to Apparatus for Severing Metals by Fusion, of which the following is a specification.

This invention relates to apparatus for severing metals by fusion, and particularly to apparatus of the type in which a wheeled carriage supporting an oxy-acetylene or similar burner is moved upon a curved or other track or guiding rail so as to follow the desired line of severance.

As hitherto constructed, the movement of the carriage has been effected either directly by hand or through the intervention of hand driven gearing.

According to this invention the wheeled carriage carrying the burner or blow pipe is adapted to be set to adjust the angle of cut, and is provided with a motor which is suitably connected to one of the wheels of the carriage so as to propel the same during the severing operation.

In order that the said invention may be clearly understood and readily carried into effect I will proceed to describe the same more fully with reference to the accompanying drawings, in which:—

Figure 1 is a side elevation of an apparatus embodying the present invention. Fig. 2 is a plan, and Fig. 3 is an end view thereof. Fig. 4 is a detail of the track wheel reversed and used as a pivot for circular cutting.

Referring to the accompanying drawings $a$ indicates a plate forming a carriage which has upon one side thereof an arm or projection $a'$ perforated for the passage of a vertical rod $b$. The arm $a'$ is slotted at $a^2$ so that the rod is adjustably clamped in the arm. The rod at the lower end is forked and carries a wheel $c$. Pivotally connected to one end of the plate $a$ upon the underside thereof is a caster $d$. Secured in any convenient manner upon the plate $a$ is an electric motor $e$ to which current is supplied by means of flexible conductors $e'$, a plug $e^2$ thereon serving to connect the conductors $e'$ with an electric lamp or other socket. The spindle $e^3$ of the motor is connected to reduction gearing comprising a worm $f$ on said spindle, engaging a worm wheel not shown, and mounted on a spindle carrying a worm engaging a second worm wheel $f^2$ mounted on spindle $f^3$ from which motion is transmitted by a worm $f^4$ to a worm wheel on the spindle of a large disk $g$ which disk constitutes the driving wheel of the carriage. The gearing is inclosed in a box or case $f'$. The wheel $c$, caster wheel $d$ and disk $g$ engage suitable tracks formed in the upper surface of the plate $h$, said tracks guiding the carriage so that it follows a regular straight or curved path as the case may be.

The carriage $a$ is provided with lateral arms or projections $a^3$, $a^4$ to which are secured the ends of a member $i$ in which the nozzle of the blow pipe $j$ is adjustably secured. The blow pipe is of known construction so that a detailed description thereof is unnecessary. Adjustably secured upon the horizontal portion $k$ of the blow pipe by means of a clamp $l$ is a vertical rod $l'$, the end of which carries a wheel $l^2$ disposed upon the same line as the aforesaid disk $g$, the wheel $l^2$ engaging the path or track of the disk $g$. A switch $m$ is provided upon the carriage $a$ to control the passage of the current to the motor.

When it is desired to use the apparatus for effecting a straight cut, the various wheels and the disk $g$ are placed upon straight tracks and the motor started when the carriage will move forward at a constant speed flow in accordance with the thickness of the metal to be cut. Should it be desired that the severed edge be inclined, the necessary inclination of the carriage $a$ may be regulated by suitably adjusting the height of the wheel $c$ with respect to the carriage.

Where it is desired that the carriage shall follow a circular path the member $k$ of the blow pipe is turned into a position as indicated by the dotted lines $k'$ Fig. 2 when it is at a right angle to the line of the carriage. The rod $l'$ has on one end a pivot $l^3$ and this rod is reversed so that the pivot $l^3$ may be used as a center for circular cutting. The position of the clip $l$ is adjusted along the blow-pipe to give the required radius and the wheel $c$ and its holder $b$ are removed. Should the radius required be outside the limits of the member $k$ said member may be replaced by a longer tube, or sections may be added thereto, to enable the desired radius to be obtained. To protect the motor or other parts of the apparatus from injury, a guard plate n may be provided as shown in full in Fig. 2, and in dotted lines in Fig. 3.

What I claim and desire to secure by Letters Patent of the United States is:—

1. In apparatus for severing metals by fusion, the combination with a blow pipe, of a carriage, adjustable wheels on said carriage for adjusting the angle of cut and a motor geared to one of the wheels of the carriage to propel the same during the severing operation.

2. In apparatus for severing metals by fusion, the combination with a blow pipe, of a carriage, adjustable wheels on said carriage for adjusting the angle of cut, a motor geared to one of the wheels of the carriage to propel the same during the severing operation, and an adjustable support carried by the blow pipe for controlling the path of movement of the carriage.

3. In apparatus for severing metals by fusion, the combination with a blow pipe of a carriage, adjustable wheels on said carriage for adjusting the angle of cut, a motor geared to one of the wheels of the carriage to propel the same during the severing operation, and a reversible vertical support for the blow pipe which can be set thereon in such a manner as to confine the movement of the carriage to a circular path.

In testimony whereof I affix my signature in presence of two witnesses.

CHARLES TIBBIT LACK.

Witnesses:
T. SELBY WARDLE,
F. J. COOKSEY.